United States Patent
Moon et al.

(10) Patent No.: US 7,471,700 B2
(45) Date of Patent: Dec. 30, 2008

(54) ROUTER AND METHOD FOR CONTROLLING MAXIMUM TRANSMISSION UNIT OF EXTERNAL NETWORK INTERFACE

(75) Inventors: Seong Moon, Daejeon (KR); Boo Geum Jung, Daejeon (KR); Kyoung Soon Kang, Daejeon (KR); Wan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 881 days.

(21) Appl. No.: 10/686,265

(22) Filed: Oct. 15, 2003

(65) Prior Publication Data

US 2004/0105438 A1 Jun. 3, 2004

(30) Foreign Application Priority Data

Nov. 29, 2002 (KR) ............... 10-2002-0075394

(51) Int. Cl.
*H04J 3/24* (2006.01)
(52) U.S. Cl. .................... 370/474; 370/389
(58) Field of Classification Search .......... 370/474, 370/476, 395.6, 395.61, 395.62, 395.63, 370/395.64
See application file for complete search history.

(56) References Cited

U.S. PATENT DOCUMENTS

| | | | |
|---|---|---|---|
| 5,307,351 A | * | 4/1994 | Webster ............ 370/470 |
| 6,894,976 B1 | * | 5/2005 | Banga et al. ............ 370/235 |
| 6,934,280 B1 | * | 8/2005 | Ho et al. ............ 370/352 |
| 7,068,616 B2 | * | 6/2006 | Chang et al. ............ 370/316 |
| 2001/0036185 A1 | * | 11/2001 | Dempo ............ 370/392 |
| 2001/0055317 A1 | * | 12/2001 | Kajizaki et al. ............ 370/474 |
| 2004/0170182 A1 | * | 9/2004 | Higashida et al. ............ 370/401 |

FOREIGN PATENT DOCUMENTS

KR 2002-0051544 6/2002

OTHER PUBLICATIONS

IEEE Communications Magazine, 1998 IEEE, "Issues and Trends in Router Design", S. Keshav, et al., p. 144-151.
"The software architecture for internal data processing in high speed router system", W. Lee, et al., 5 pages (with translation), Jan. 2002.

* cited by examiner

*Primary Examiner*—Ricky Ngo
*Assistant Examiner*—Kan Yuen
(74) *Attorney, Agent, or Firm*—Blakely, Sokoloff, Taylor & Zafman LLP

(57) ABSTRACT

Provided are a router and a method of controlling a maximum transmission unit (MTU) of an external network interface. The router controls the MTU by disassembling packet data segments of a predetermined size and assembling the data segments of the predetermined size into the original packet data structure when the external network interface physically included in a linecard processor has an MTU that is greater than that of an internal data communication channel of the router, so that the external network interface can transmit and receive data with another router without being affected by the MTU of the internal data communication channel in the operating system of the router.

6 Claims, 6 Drawing Sheets

ROUTER AND METHOD FOR CONTROLLING MAXIMUM TRANSMISSION UNIT OF EXTERNAL NETWORK INTERFACE

CROSS REFERENCE TO RELATED APPLICATION

This application claims the priority of Korean Patent Application No. 2002-75394, filed on 29 Nov. 2002 in the Korean Intellectual Property Office, the disclosure of which is hereby incorporated by reference in its entirety.

BACKGROUND OF THE INVENTION

1. Field of the Invention

The present invention relates to a router system, and more particularly, to a router and method for controlling a maximum transmission unit of an external network interface.

2. Description of the Related Art

FIG. 1 is a block diagram illustrating a high-capacity router 10 according to prior art, where the router 10 includes a routing processor 11, an ethernet switch 12, a switch fabric 13, and a plurality of linecard processors 15 through 18.

The routing processor 11 performs a routing function that generates and calculates a routing table and a total management function to smoothly operate the router 10. The ethernet switch 12 performs switching operations for internal data communication of the linecard processors 15 through 18, respectively. The switch fabric 13 performs high-speed switching to enable packet data transmission through data ports. The plurality of linecard processors 15 through 18 connected to the ethernet switch 12, looks up a forwarding table to determine the appropriate output port for transmitting a received data packet to other network.

The plurality of linecard processors 15 through 18 respectively include an external network interface and a network processor (not shown) which manages the look-up of the forwarding table and the packet data transmission. Each external network interface is a packet over SONET interface (POS IF) 5, an asynchronous transfer mode interface (ATM IF) 6, a gigabit ethernet interface (GE IF) 7, or a 10/100 Mbps ethernet interface (10/100M IF) 8 (hereinafter, generally referred to as external network interfaces 5 through 8).

The routing processor 11 executes programs, which update information of the routing table and forwarding table in response to a phase shift of the network. Here, the programs can include support for border gateway protocol (BGP), open shortest path first (OSPF), or Telnet, interacting with programs running in other routers. The programs are executed by the external network interfaces 5 through 8 respectively included in the linecard processors 15 through 18.

However, since the location of the executed programs and the external network interfaces 5 through 8 used in program are not identical, an operating system of the routing processor 11 provides environment that the programs can be executed smoothly via virtual network interface. Here, the virtual network interface is shaped logically, wherein the external network interfaces 5 through 8 of the linecard processor 15 through 18 are implemented in the operating system of the routing processor 11. The virtual network interfaces connected with the physical interfaces have been disclosed in U.S. Pat. No. 5,970,066, titled "Virtual ethernet interface" issued to Lowry et al. on 19, Oct. 1999 and in U.S. Pat. No. 6,330,599, titled "Virtual Interfaces with dynamic binding" issued to Harvey on 11, Dec. 2001.

In general, a network interface such as an ethernet interface has a maximum transmission unit (hereinafter, referred to as an MTU) denoting the largest number of bytes that can be transmitted at a time. Most high-capacity routers use IEEE 802.3 ethernet interface for data transmission through a virtual network interface, where the MTU of the IEEE 802.3 ethernet interface is 1,500 bytes. Thus, if an external network interface requires an MTU greater than 1,500 bytes, the virtual network interface cannot support such an MTU according to prior art.

SUMMARY OF THE INVENTION

The present invention provides a router and method for controlling a maximum transmission unit (MTU) of an external network interface by disassembling a packet data into data segments of a predetermined size and assembling the data segments into the original packet data structure, which allows the external network interface physically included in a linecard processor, to transmit and receive data without being affected by the MTU of an internal data communication channel of the router.

The present invention also provides a computer readable medium having embodied thereon a computer program for the method of disassembling packet data into data segments of a predetermined size and assembling data segments into the original packet data structure.

According to an aspect of the present invention, there is provided a router comprising a routing processor and at least one linecard processor. The routing processor shapes at least one physically existing external network interface as a logically virtual network interface. At least one linecard processor includes the external network interface. The routing processor and the linecard processor control a maximum transmission unit (MTU) of the external network interface by disassembling packet data, transmitted and received between the routing processor and the linecard processor, into data segments of a predetermined size and assembling the disassembled data segments into the original packet data structure, if the MTU of the external network interface is greater than the MTU of an internal data communication channel in the router.

According to another aspect of the present invention, there is provided a method of supporting a maximum transmission unit (MTU) of an external network interface. The method comprises (a) if a packet data transmission request is received from an upper layer of a virtual network interface included in a routing processor, determining whether amount of packet data to be transmitted and additional header is greater than the MTU of an internal data communication channel of a router, (b) if it is determined that the amount of packet data and additional header is greater than the MTU of the internal data communication channel of the router in step (a), disassembling the packet data into data segments of a predetermined size, such that the amount of data segment and additional header is not greater than the MTU of the internal data communication channel, and transmitting the data segments of the predetermined size to an external IPC interface of a linecard processor, (c) if it is determined that the amount of packet data and additional header is not greater than the MTU of the internal data communication channel in the operating system of the router in step (a), adding the additional header to the packet data, and transmitting the packet data to the external IPC interface, (d) determining whether data received by the external IPC interface is a disassembled data segment, (e) if it is determined that data received by the external IPC interface is a disassembled data segment in step (d), removing the additional header from the received data segment, assembling the received data segments into the original packet data, transmitting the assembled packet data to the external network interface, and requesting a packet data transmission to the external network interface, and (f) if it is determined that the data received by the external IPC interface is not a disassembled data segment in step (d), removing the additional header from the data, transmitting the data to the external network interface, and requesting the packet data transmission to the external network interface.

According to yet another aspect of the present invention, there is provided A method of supporting a maximum transmission unit (MTU) of an external network interface. The method comprises (a) if packet data is received by the external network interface included in a linecard processor, determining whether the amount of packet data and additional header is greater than the MTU of an internal data communication channel of a router, (b) if it is determined that the amount of packet data and additional header is greater than the MTU of the internal data communication channel in the operating system of the router in step (a), disassembling the packet data into data segments of a predetermined size, such that the amount of packet data and additional header is not greater than the MTU of the internal data communication channel, and transmitting the data segments of the predetermined size to a virtual network interface of a routing processor, (c) if it is determined that the amount of the packet data and additional header is not greater than the MTU of the internal data communication channel in the operating system of the router in step (a), adding the additional header to the packet data and transmitting the packet data to the virtual network interface, (d) determining whether data received by the virtual network interface is a disassembled data segment, (e) if it is determined that data received by the virtual network interface is a disassembled data segment of in step (d), removing the additional header from the received data segment, assembling the received data segments into the original packet data, and transmitting the packet data to an upper layer of the virtual network interface, and (f) if it is determined that the data received by the virtual network interface is not a disassembled data segment in step (d), removing the additional header from the received data packet and transmitting the data to the upper layer of the virtual network interface.

BRIEF DESCRIPTION OF THE DRAWINGS

The above and other aspects and advantages of the present invention will become more apparent by describing in detail an exemplary embodiment thereof with reference to the attached drawings in which.

DETAILED DESCRIPTION OF THE INVENTION

Figure 1:
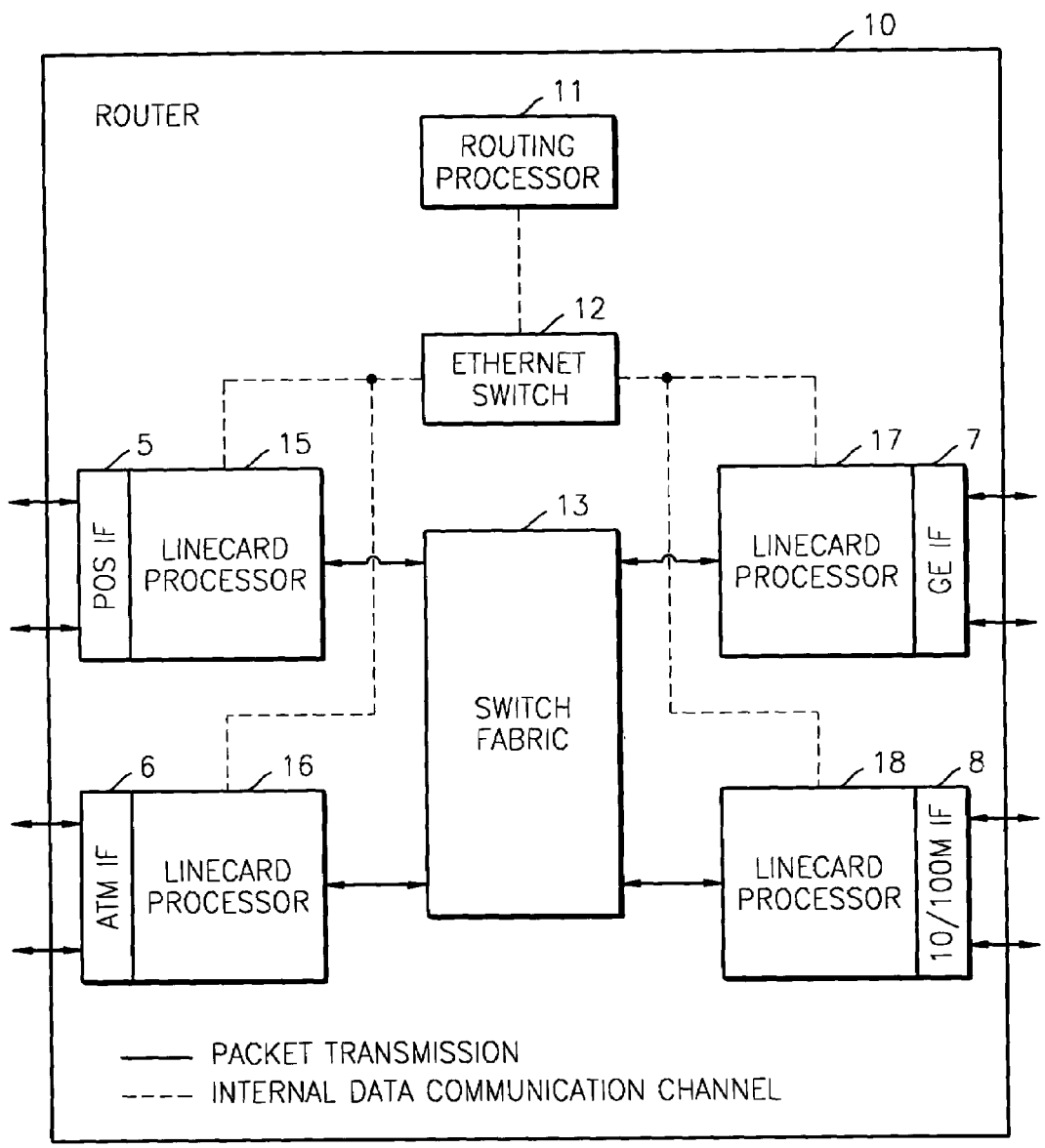
FIG. 1 is a block diagram of a high-capacity router according to prior art.

The present invention will now be described more fully with reference to the accompanying drawings, in which a preferred embodiment of the invention is shown. In the drawings, the forms of elements are exaggerated for clarity. To facilitate understanding, identical reference numerals have been used, where possible, to designate identical elements that are common to the figures.

Figure 2:
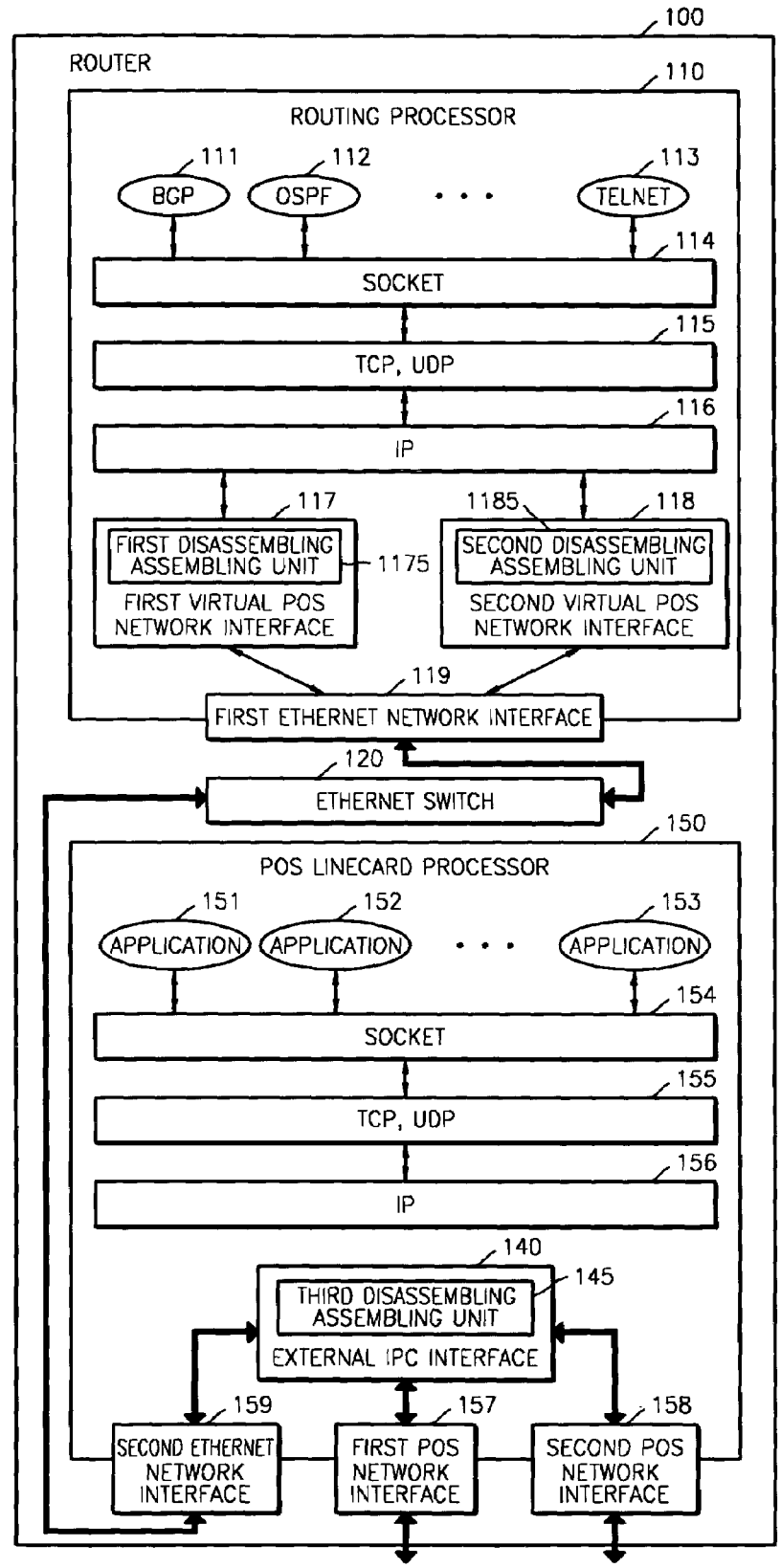
FIG. 2 is a block diagram of a router for supporting the maximum transmission unit (MTU) of an external network interface (a first or second point-of-service (POS) network interface) according to the present invention.

FIG. 2 is a block diagram illustrating a router 100 having a function of controlling a maximum transmission unit (hereinafter, referred to as an MTU) for an external network interface according to the present invention. Referring to FIG. 2, external network interfaces are logically shaped as virtual network interfaces. The external network interfaces are represented by the first packet over SONET (POS) network interface 157 and the second packet over SONET (POS) 158 physically included in a POS linecard processor 150. The virtual network interfaces are represented by the first virtual POS network interface 117 and the second virtual POS network interface 118 in an operating system of a routing processor 110.

The router 100 includes the routing processor 110, an ethernet switch 120, and at least one POS linecard processor 150. The POS linecard processor 150 requires an MTU greater than the MTU of 1500 bytes supported by the first and second ethernet interfaces 119 and 159 and conformant to the IEEE 802.3 standards. At least one POS linecard processor 150 can be connected to the ethernet switch 120.

Hereinafter, a configuration of the routing processor 110 will be described with reference to FIG. 2.

The routing processor 110 includes routing protocols, such as border gateway protocol (hereinafter, referred to as BGP) 111 and open shortest path first (hereinafter, referred to as OSPF) 112, TELNET 113, a SOCKET 114, transmission control protocol (TCP)/user datagram protocol (UDP) (hereinafter, referred to as TCP and UDP) 115, internet protocol (IP) 116, first and second virtual POS network interfaces 117 and 118, and a first ethernet interface 119.

BGP 111 is an exterior gateway protocol used when routing information is exchanged between two networks with different autonomous system (AS) numbers. When routing information is exchanged between two networks with the same AS number, such as an interior gateway protocol OSPF 112 is used. Telnet 113 is an application program that allows a user to contact a remote host computer using TCP/IP, and access the system resources of that remote host. After Telnet 113 is executed, the user can use freely various commands through network virtual terminal (NVT) of a computer. The application programs supporting BGP 111, OSPF 112, and Telnet 113 are connected through SOCKET 114 and assigned port numbers connected to the SOCKET 114 by a programmer.

TCP and UDP 115 are transmission protocols connected between the socket 114 interface and the IP 116 layer. TCP is a protocol which provides stable data transmission services including end-to-end error detection and correction. UDP is a non-connection oriented protocol by which data is transmitted irrespective of whether the other end receives data, in contrast to TCP, through which data is transmitted in a connection state of two ends. TCP and UDP 115 transmit data between the IP 116 layer and the socket 114 that is connected to the application programs.

The routing processor 110 also includes the ethernet interface 119 physically connected to the ethernet switch 120. The first and second virtual POS network interfaces 117 and 118, by logically shaping the external network interface, i.e., the first and second POS network interfaces 157 and 158 of the POS linecard processor 150 are connected between the ethernet interface 119 and IP 116 layer.

The routing protocols which are executed in the routing processor 110, such as BGP 111 and OSPF 112, operate based on information about network interfaces existing in the operating system. In the router 100, the external network interfaces, such as the first and second POS network interfaces 157 and 158 physically existing in the POS linecard processor 150 are logically shaped as the virtual network interfaces such as the first and second virtual POS network interfaces 117 and 118 in the inside of the operating system of the routing processor 110, so that the routing protocols such as BGP 111 and OSPF 112 can be smoothly executed. If the MTU of a data channel used by both the routing processor 110 and the POS linecard processor 150 is not greater than the MTUs of the first and second POS network interfaces 157 and 158, then the MTUs of the first and second POS network interfaces 157 and 158 cannot be normally shaped. Thus, in the present invention, the router 100 has a function of controlling MUTs of external network interfaces 157 and 158, so that the external network interfaces 157 and 158 are not curbed from the MUT of the ethernet interface 119. When the first and second POS network interfaces 157 and 158 are logically shaped as the first and second virtual POS network interfaces 117 and 118 in the operating system of the routing processor 110.

In order to control the MTU of the external network interfaces 157 and 158, the first and second virtual POS network interfaces 117 and 118 respectively include first disassembling/assembling unit 1175 and second disassembling/assembling unit 1185 which disassemble packet data which is transmitted and received into data segments of a predetermined size and assemble the data segments into the original packet data structure. The first and second disassembling/assembling units 1175 and 1185, respectively included in the first and second virtual POS network interfaces 117 and 118, make the IP 116 layer as an upper layer of the virtual POS interfaces 117 and 118 consider that the network interface, i.e., the ethernet interfaces 119 and 159 support an MTU greater than 1,500 bytes whereas the network interface, i.e., the ethernet interfaces 119 and 159 internally process data in units of 1,500 bytes that can be transmitted by the network interface. As a result, the MTUs of the external network interfaces, i.e., the first and second POS network interfaces 157 and 158, can be abstracted, so that the virtual network interfaces 117 and 118 can appear to support the MTU_same as the MTUs of the external interfaces 157 and 158.

The POS linecard processor 150, which is connected to the routing processor 110 through the ethernet switch 120, is configured as follows.

In the same manner as the routing processor 110, the POS linecard processor 150 includes a plurality of application programs 151 through 153, a SOCKET 154, TCP and UDP 155, and an software layer like the IP layer 156. The POS linecard processor 150 further includes the second ethernet interface 159, the first and second POS network interfaces 157 and 158, and an external inter process communication (IPC) interface 140. The second ethernet interface 159 functions as a physical interface of the POS linecard processor 150 and is connected to the ethernet switch 120. The first and second POS interfaces 157 and 158 require an MTU greater than that of data (1,500 bytes) supported by the first and second ethernet interfaces 119 and 159 in the router 100. The external IPC interface 140 controls input/output data between the second ethernet interface 159 and the first and second POS network interfaces 157 and 158. Here, the first and second POS interfaces 157 and 158 respectively correspond to the first and second virtual POS interfaces 117 and 118 of the routing processor 110. The external IPC interface 140 includes a third disassembling/assembling unit 145, which disassembles packet data into data segments of a predetermined size and assembles the data segments into the original packet data structure to perform abstraction of the MTU of the first and second virtual POS network interfaces 117 and 118, so that the first and second virtual POS network interfaces 117 and 118 of the routing processor 110 appear to support the MTU same as the MTU of the first and second POS network interfaces 157 and 158.

Abstraction of the MTU of the external network interfaces 157 and 158, will be described with reference to FIGS. 3 through 6.

Figure 3:
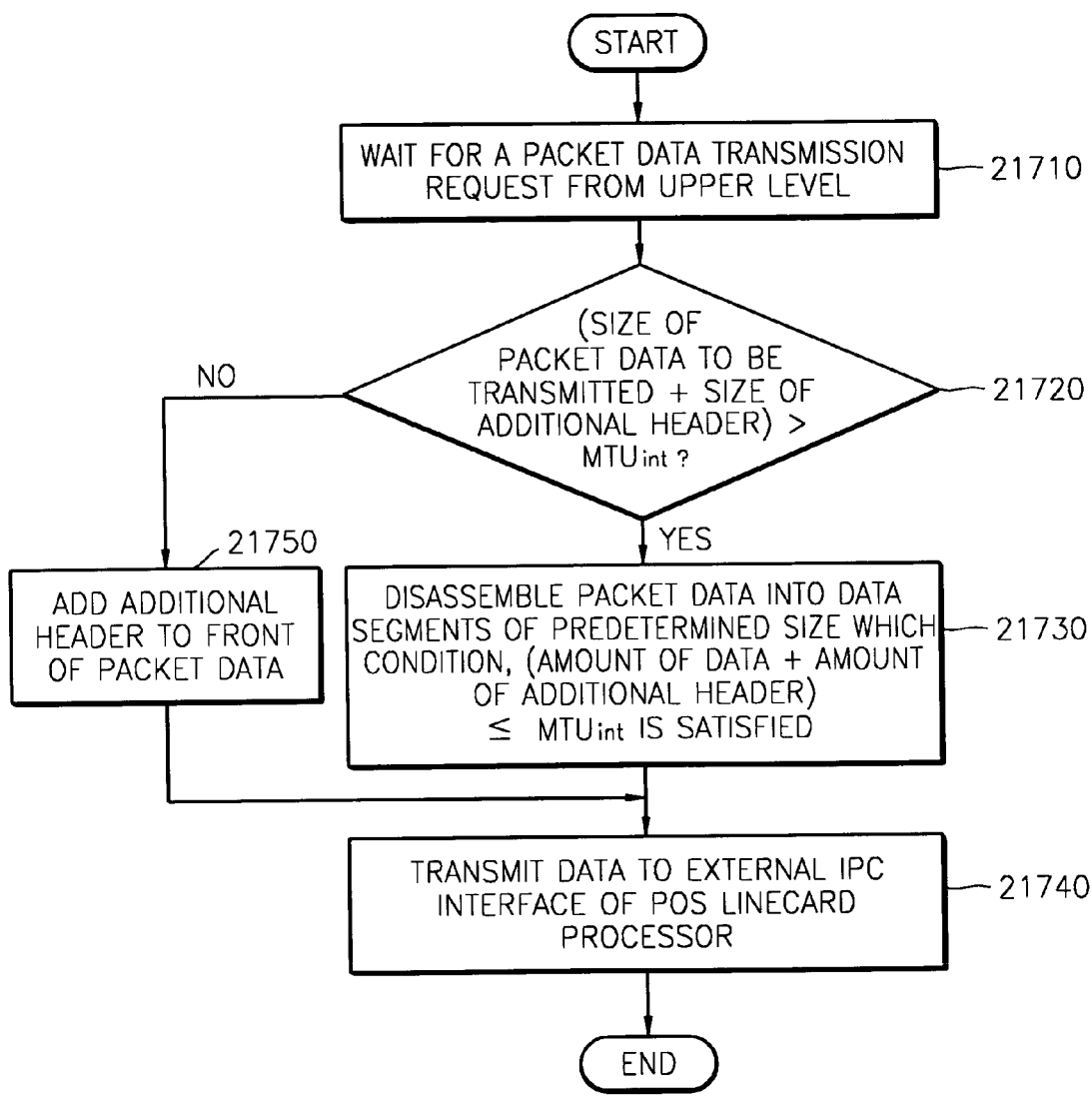
FIG. 3 is a flowchart illustrating packet data disassembly performed by a disassembling/assembling unit of a virtual network interface (a first or second virtual POS network interface of FIG. 2) included in a routing processor when it is required to transmit data from an upper level of the virtual network interface (for example, an IP level of FIG. 2) to an external linecard processor (a POS linecard processor of FIG. 2), according to the present invention.

FIG. 3 is a flowchart illustrating packet data disassembly performed by the first and second disassembling/assembling units 1175 and 1185 of the first and second virtual POS network interfaces 117 and 118 of FIG. 2 when the data packet is transmitted from the upper level of the first and second virtual POS network interfaces 117 and 118 (for example, the IP 116 level) to the external linecard processor.

The first and second disassembling/assembling units 1175 and 1185 of the first and second virtual POS network interfaces 117 and 118 wait for a packet data transmission request from the upper level (for example, the IP 116 level) in step 21710. Upon receipt of the packet data transmission request, the first and second disassembling/assembling units 1175 and 1185 determine whether the size of packet data to be transmitted plus additional header is greater than the MTU of the internal data communication channel of the router 100 (i.e., MTUnit), i.e., whether the condition "(the amount of packet data to be transmitted+the amount of additional header) >MTUnit" is satisfied, in step 21720.

In step 21720, if the size of packet data to be transmitted plus additional header is greater than the MTU of the internal data communication channel in the operating system of the router 100 (i.e., MTUnit), the first and second disassembling/assembling units 1175 and 1185 disassemble the packet data into data segments of a predetermined size, so that the condition "(the amount of data+the amount of additional header) ≦MTUnit" can be satisfied, in step 21730. Then the first and second disassembling/assembling units 1175 and 1185 transmit the disassembled data segments to the external IPC interface 140 of the POS linecard processor 150 in step 21740.

In step 21720, if the size of packet data to be transmitted plus additional header is not greater than the MTU of the internal data communication channel in the operating system of the router 100 (i.e., MTUnit), the first and second disassembling/assembling units 1175 and 1185 add the additional header to the front of the packet data in step 21750, and transmit the packet data and the additional header to the external IPC interface 140 of the POS linecard processor 150 in step 21740.

The external IPC interface 140 includes the third disassembling/assembling unit 145, assembles the disassembled data segments into the original packet data structure using the third disassembling/assembling unit 145, and requests transmission of packet to the external network interface 157 and 158 to transmit the assembled packet data to the network through the external network interfaces 157 and 158. The third disassembling/assembling unit 145 in the external IPC interface 140 performs the packet data assembly as follows.

Figure 4:
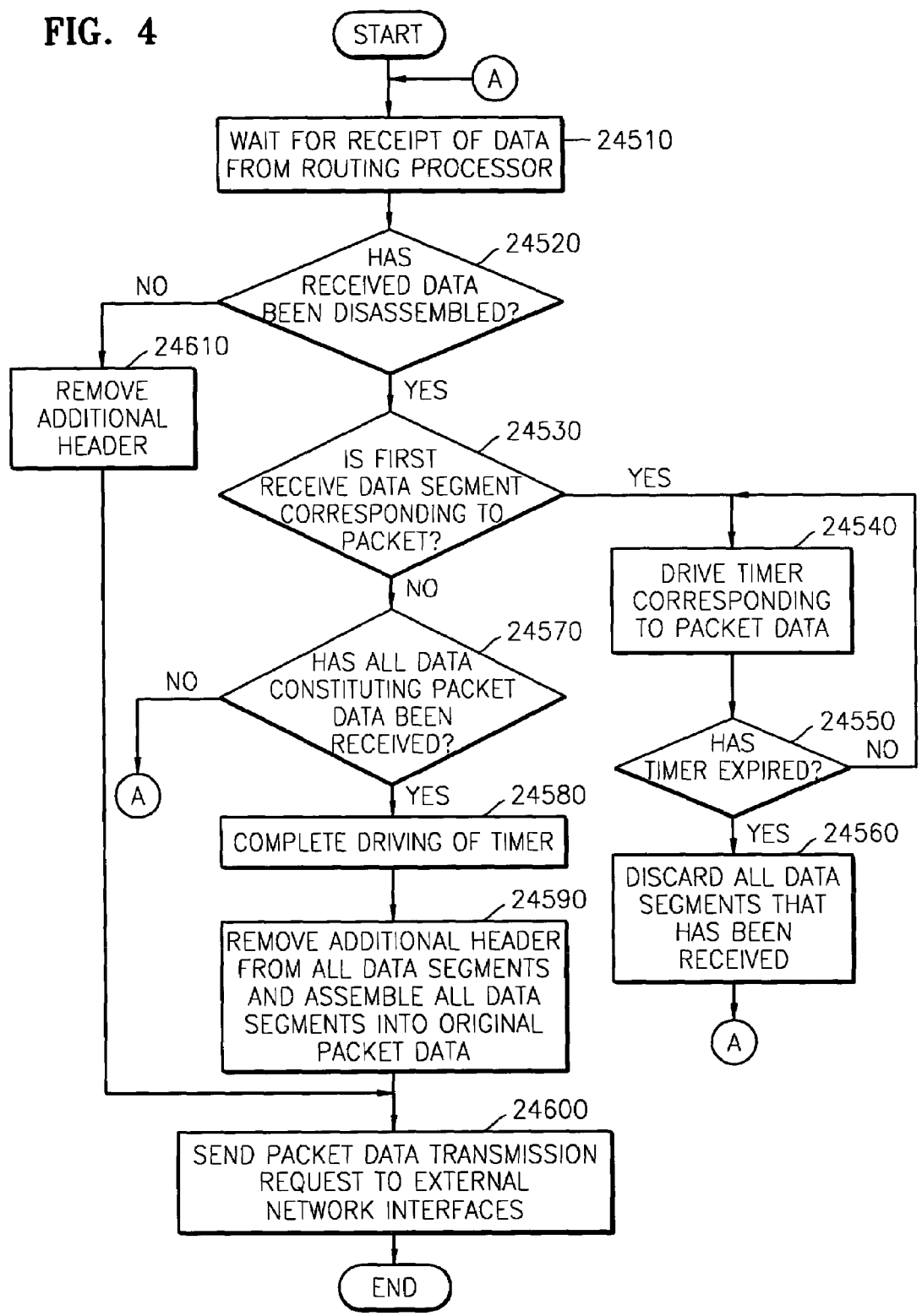
FIG. 4 is a flowchart illustrating packet data assembly of data transmitted from the routing processor performed by a disassembling/assembling unit of an external IPC interface included in the external linecard processor (the POS linecard processor of FIG. 2) when it is required to transmit data from the upper level of the virtual network interface (for example, the IP level) to the external linecard processor, according to the present invention.

FIG. 4 is a flowchart illustrating packet data assembly performed by the third disassembling/assembling unit 145 of the external IPC interface 140 included in the external POS linecard processor 150 when the data packet is transmitted from the upper level of the virtual POS network interfaces 117 and 118 (for example, the IP 116 level) to the external linecard processor.

The third disassembling/assembling unit 145 of the external IPC interface 140 of the POS linecard processor 150 waits for receipt of data from the routing processor 110 in step 24510. Upon receipt of data from the routing processor 110, the third disassembling/assembling unit 145 determines whether the data is a disassembled data in step 24520.

In step 24520, if the received data is not a disassembled data, the third disassembling/assembling unit 145 removes the additional header from the received data, in step 24610, transmits the received data to the external network interfaces 157 and 158, and request a packet data transmission to the external network interfaces 157 and 158 in step 24600. In step 24520, if the received data is a disassembled data, the third disassembling/assembling unit 145 determines whether the received data is the first received data segment corresponding to a packet in step 24530.

If the received data corresponding to a packet is the first received data segment corresponding to the packet, the third disassembling/assembling unit 145 drives a timer corresponding to the packet data in step 24540. Then the third disassembling/assembling unit 145 determines whether the timer has expired in step 24550. If the timer has expired in step 24550, the third disassembling/assembling unit 145 discards all data that has been received up to the time of the timer expiration in step 24560, and then waits for receipt of data, going back to step 24510. If the timer has not expired, the third disassembling/assembling unit 145 drives the timer until the timer expires, in step 24540. If the received data is not the first received data segment corresponding to the packet in step 24530, the third disassembling/assembling unit 145 determines whether all data segments constituting the packet data has been received in step 24570.

If all data segments constituting the packet data has been received, the third disassembling/assembling unit 145 completes driving of the timer in step 24580. Then the third disassembling/assembling unit 145 removes the additional header from all data segments and assembles all data segments into the original packet data in step 24590. The third disassembling/assembling unit 145 transmits the assembled packet data to the external network interfaces 157 and 158 and requests the packet data transmission to the external network interfaces 157 and 158 in step 24600. If all data segments has not yet been received, the third disassembling/assembling unit 145 goes back to step 24510 and waits for receipt of more data.

Figure 5:
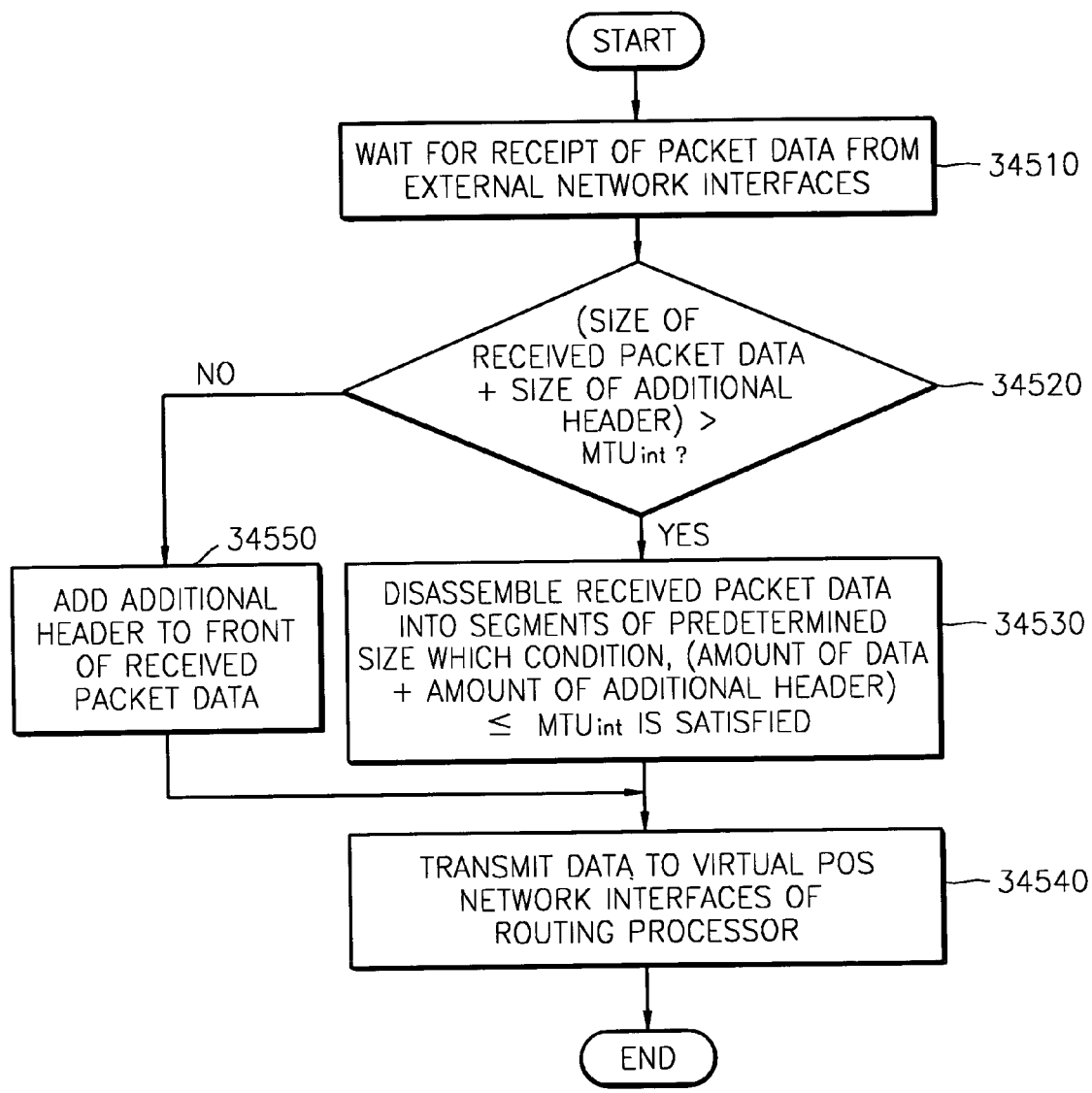
FIG. 5 is a flowchart illustrating packet data disassembly performed by the disassembling/assembling unit of the external IPC interface included in the external linecard processor of FIG. 2 when it is required to transmit data received by the external linecard processor to the routing processor, according to the present invention.

FIG. 5 is a flowchart illustrating packet data disassembly performed by the third disassembling/assembling unit 145 of the external IPC interface 140 included in the POS linecard processor 150 of FIG. 2 when data received by the POS linecard processor 150 must be transmitted to the routing processor 110.

Referring to FIG. 5, in step 34510, the third disassembling/assembling unit 145 of the external IPC interface 140 included in the POS linecard processor 150 waits for receipt of packet data from the external network interfaces connected to the external IP interface 140. Upon receipt of the packet data from the external network interfaces 157 and 158, the third disassembling/assembling unit 145 determines whether the size of received packet data plus additional header is greater than the MTU of the internal data communication channel (i.e., MTUnit) in the operating system of the router 100, i.e., whether the condition "(the size of received packet data+the size of additional header)>the MTUnit" is satisfied, in step 34520.

If the size of the received packet data plus additional header is greater than the MTU of the internal data communication channel (i.e., MTUnit) in the operating system of the router 100, the third disassembling/assembling unit 145 disassembles the received packet data into data segments of a predetermined size, so that the condition "(the amount of data+the amount of additional header)≦MTUnit" can be satisfied, as shown in step 34530. Then the third disassembling/assembling unit 145 transmits the data segments to the virtual POS network interfaces 117 and 118 of the routing processor 110 in step 34540.

If the size of the received packet data plus additional header is not greater than the MTU of the internal data communication channel (i.e., MTUnit) in the operating system of the router 100, the third disassembling/assembling unit 145 adds the additional header to the front of the received packet data in step 34550 and transmits the packet data to the virtual POS network interfaces 117 and 118 of the routing processor 110 in step 34540.

Figure 6:
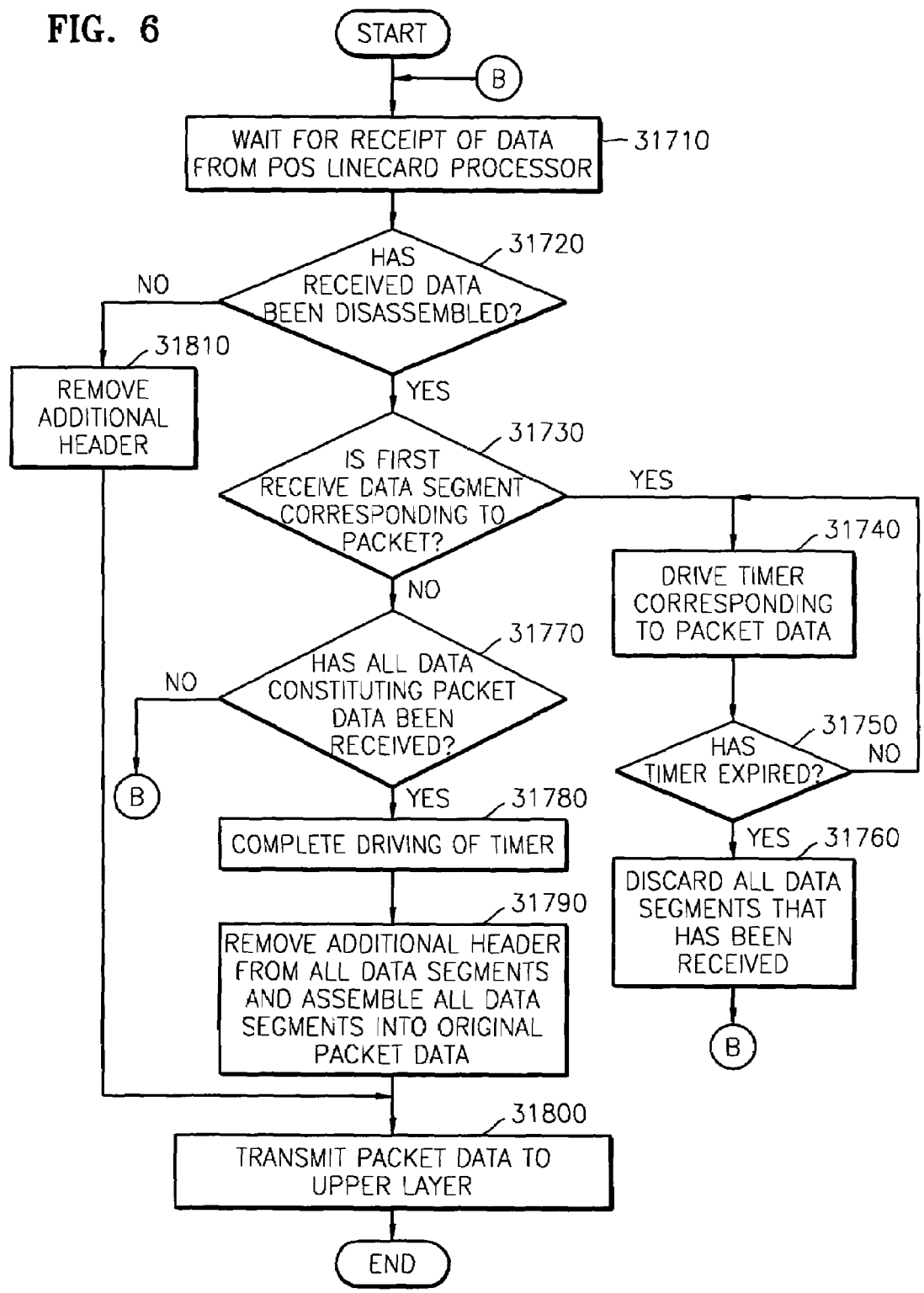
FIG. 6 is a flowchart illustrating packet data assembly of data transmitted from the external linecard processor of FIG. 2 performed by the disassembling/assembling unit of the virtual network interface included in the routing processor when it is required to transmit data received by the external linecard processor to the routing processor, according to the present invention.

FIG. 6 is a flowchart illustrating packet data assembly performed by the first and second disassembling/assembling units 1175 and 1185 of the virtual POS network interfaces 117 and 118 included in the routing processor 110 when data received by the POS linecard processor 150 must be transmitted to the routing processor 110.

Referring to FIG. 6, the first and second disassembling/assembling units 1175 and 1185 of the virtual POS network interfaces 117 and 118 included in the routing processor 110 wait for receipt of data from the POS linecard processor 150 in step 31710. Upon receipt of data from the POS linecard processor 150, the first and second disassembling/assembling units 1175 and 1185 determine whether the received data is a disassembled data in step 31720.

If the received data is not a disassembled data, the first and second disassembling/assembling units 1175 and 1185 remove the additional header from the received data in step 31810 and transmit the data to the upper level of the virtual POS network interfaces 117 and 118 (for example, the IP layer 116) in step 31800. If the received data is a disassembled data, the first and second disassembling/assembling units 1175 and 1185 determine whether the received data is the first received data segment corresponding to a packet in step 31730.

If the received data is the first received data segment, the first and second disassembling/assembling units 1175 and 1185 drive a timer corresponding to the packet data in step 31740. Then the first and second disassembling/assembling units 1175 and 1185 determine whether the timer has expired in step 31750. If the timer has expired, the first and second disassembling/assembling units 1175 and 1185 discards all data that has been received up to the time the timer expiration in step 31760, and then wait for receipt of data, going back to step 31710. If the timer has not expired, the first and second disassembling/assembling units 1175 and 1185 drive the timer until the timer expires, in step 31740. If the received data is not the first received data segment corresponding to a packet, the first and second disassembling/assembling units 1175 and 1185 determine whether all data segments constituting the packet data has been received in step 31770.

If all data segments constituting the packet data has been received, the first and second disassembling/assembling units 1175 and 1185 complete driving of the timer in step 31780, and then remove the additional header from all data and assemble all data segments into the original packet data in step 31790. Then the first and second disassembling/assembling units 1175 and 1185 transmit the assembled packet data to the upper level of the virtual POS network interfaces 117 and 118 (for example, the IP layer 116) in step 31800.

As described above, the router 100 according to the present invention includes the virtual POS network interfaces 117 and 118 and the external IPC interface 140 included in the first and second disassembling/assembling units 1175 and 1185 when data that is greater than the MTU (1,500 bytes) supported by the internal data communication channel of the router 100 is transmitted, the data is disassembled into data segments of a predetermined size (for example, data of 1,500 bytes) and data segments are assembled into the original data structure. Thus, the router 100 can support the MTU of the external network interfaces greater than the MTU (1,500 bytes) of the internal data communication channel of the router 100. Therefore, the difficulties in transmitting and receiving data, which occur due to the limit of the MTU of the internal data communication channel used between the routing processor 110 and the POS linecard processor 150 can be solved.

In the embodiments of the present invention, data transmission between a POS linecard processor and a router processor is described in detail. However, the present invention can be applied to any external network interface whose MTU is greater than the MTU of an ethernet interface conformant with IEEE 802.3 standards.

The present invention may be embodied in a general purpose digital computer by running a program from a computer usable medium. The computer usable medium includes, but is not limited to storage media such as ROM, RAM, CD-ROMs, magnetic tapes, floppy disks, optical data storage media, (e.g., transmissions over the Internet). In addition, the computer readable medium may be distributed through computer network systems, may be stored, and may be executed in the form of computer readable codes.

According to the present invention, the MTU of the external network interface physically existing in the linecard processor, can be abstracted, so that the external network interface can transmit and receive data without being affected by the MTU of the internal data communication channel of the router.

While the present invention has been particularly shown and described with reference to exemplary embodiments thereof, it will be understood by those of ordinary skill in the art that various changes in form and details may be therein without departing from the spirit and scope of the invention as defined by the appended claims and their equivalents.

What is claimed is:

1. A method of supporting a maximum transmission unit (MTU) of an external network interface, the method comprising:

(a) if a packet data transmission request is received from an upper layer of a virtual network interface included in a routing processor, determining whether amount of packet data to be transmitted and additional header is greater than the MTU of an internal data communication channel of a router;

(b) if it is determined that the amount of packet data and additional header is greater than the MTU of the internal data communication channel of the router in step (a), disassembling the packet data into data segments of a predetermined size, such that the amount of data segment and additional header is not greater than the MTU of the internal data communication channel, and transmitting the data segments of the predetermined size to an external IPC interface of a linecard processor;

(c) if it is determined that the amount of packet data and additional header is not greater than the MTU of the internal data communication channel in the operating system of the router in step (a), adding the additional header to the packet data, and transmitting the packet data to the external IPC interface;

(d) determining whether data received by the external IPC interface is a disassembled data segment;

(e) if it is determined that data received by the external IPC interface is the disassembled data segment in step (d), removing the additional header from the received data segment, assembling the received data segments into the original packet data, transmitting the assembled packet data to the external network interface, and requesting a packet data transmission to the external network interface; and (f) if it is determined that the data received by the external IPC interface is not a disassembled data segment in step (d), removing the additional header from the data, transmitting the data to the external network interface, and requesting the packet data transmission to the external network interface.

2. The method of claim 1 further comprising (g) if all data segments constituting the packet data has not yet been received within a predetermined amount of time, discarding the data which has already been received and disregarding data which is received after the predetermined amount of time has passed.

3. A method of supporting a maximum transmission unit (MTU) of an external network interface, the method comprising:

(a) if packet data is received by the external network interface included in a linecard processor, determining whether the amount of packet data and additional header is greater than the MTU of an internal data communication channel of a router;

(b) if it is determined that the amount of packet data and additional header is greater than the MTU of the internal data communication channel in the operating system of the router in step (a), disassembling the packet data into data segments of a predetermined size, such that the amount of packet data and additional header is not greater than the MTU of the internal data communication channel, and transmitting the data segments of the predetermined size to a virtual network interface of a routing processor;

(c) if it is determined that the amount of the packet data and additional header is not greater than the MTU of the internal data communication channel in the operating system of the router in step (a), adding the additional header to the packet data and transmitting the packet data to the virtual network interface;

(d) determining whether data received by the virtual network interface is a disassembled data segment;

(e) if it is determined that data received by the virtual network interface is the disassembled data segment of in step (d), removing the additional header from the received data segment, assembling the received data segments into the original packet data, and transmitting the packet data to an upper layer of the virtual network interface; and (f) if it is determined that the data received by the virtual network interface is not a disassembled data segment in step (d), removing the additional header from the received data packet and transmitting the data to the upper layer of the virtual network interface.

4. The method of claim 3, wherein the method further comprises (g) if all data constituting the packet data has not yet been received within a predetermined amount of time, discarding the data which has already been received and disregarding data which is received after the predetermined amount of time has passed.

5. A computer readable medium having embodied thereon a computer program for the method of claim 1.

6. A computer readable medium having embodied thereon a computer program for the method of claim 3.

* * * * *